(12) United States Patent
Aoki et al.

(10) Patent No.: US 6,227,719 B1
(45) Date of Patent: May 8, 2001

(54) PLASTIC OPTICAL FIBER CONNECTOR

(75) Inventors: Kazunori Aoki; Hiroyuki Oyama, both of Kanagawa-ken (JP)

(73) Assignee: Kyocera Elco Corporation, Kanagawa-ken (JP)

( * ) Notice: Subject to any disclaimer, the term of this patent is extended or adjusted under 35 U.S.C. 154(b) by 0 days.

(21) Appl. No.: 09/065,128

(22) Filed: Apr. 23, 1998

(30) Foreign Application Priority Data

May 12, 1997 (JP) .................................................... 9-121006

(51) Int. Cl.[7] ........................................................ G02B 6/38
(52) U.S. Cl. ................................ 385/59; 385/60; 385/72; 385/78
(58) Field of Search ............................. 385/53–66, 72, 385/70, 126, 78, 79, 68

(56) References Cited

U.S. PATENT DOCUMENTS

| 4,191,447 | * | 3/1980 | Borsuk | 385/60 |
|---|---|---|---|---|
| 4,611,887 | * | 9/1986 | Glover et al. | 385/53 |
| 4,762,392 | * | 8/1988 | Yamamoto et al. | 385/94 |
| 5,097,522 | * | 3/1992 | Tackett et al. | 385/53 |
| 5,179,607 | * | 1/1993 | Sellers et al. | 385/70 |
| 5,337,385 | * | 8/1994 | Baderschneider et al. | 385/59 |
| 5,557,698 | * | 9/1996 | Gareis et al. | 385/101 |
| 5,689,598 | * | 11/1997 | Dean, Jr. et al. | 385/59 |
| 5,768,458 | * | 6/1998 | Ro et al. | 385/79 |
| 5,809,192 | * | 9/1998 | Manning et al. | 385/78 |

* cited by examiner

*Primary Examiner*—Rodney Bovernick
*Assistant Examiner*—Ellen E. Kim
(74) *Attorney, Agent, or Firm*—McCormick, Paulding & Huber LLP

(57) ABSTRACT

A plastic optical fiber connector in which at least a pair of plug connectors having plastic optical fiber cables are held so that the end faces of optical fibers are opposed to each other, includes an adaptor which is provided with a plurality of connector receptacles that receive the plug connectors inserted therein from opposite directions.

9 Claims, 8 Drawing Sheets

PLASTIC OPTICAL FIBER CONNECTOR

BACKGROUND OF THE INVENTION

1. Field of the Invention

The present invention relates to a connector for a plastic optical fiber cable (POF).

2. Description of the Related Art

The amount of information which can be transmitted through a POF is considerably small in comparison with a silica glass fiber, and hence, a POF has been used in very limited fields. Therefore, a large connection loss (transmission loss) has not been considered serious. However, there has recently been a need for POF connectors to be used for a wide transmission band in place of silica glass fibers. In this connection, conventional POF connectors have many problems to be solved. For instance, if a POF is pressed and deformed, the transmission band is narrowed. Nevertheless, this problem is not taken into account in the conventional POF connectors. Moreover, in the conventional POFs, the fiber diameter at the center portion varies in the range of 0.94 to 1.06 mmφ. Consequently, the connection loss or transmission loss depends on how accurately the POF is aligned with the center axis of a ferrule. Furthermore, in the case that a number of POF connectors are interconnected on a substrate, the ease of insertion or removal of the POF connectors should be taken into account. Nevertheless, since conventional POF connectors are used solely, no operation efficiency for connection and disconnection between the POF connectors is considered.

SUMMARY OF THE INVENTION

It is an object of the present invention to provide a POF connector having a wide transmission band and less connection loss.

Another object of the present invention is to provide a POF connector in which little deformation thereof when pressed occurs; the POF can be accurately aligned on the center axis of a ferrule; and, it is possible to prevent the POF from moving relative to a ferrule by a structure in which the connection loss can be reduced.

Yet another object of the present invention is to provide a POF connector which can be easily inserted into or disconnected from another POF connector.

According to an aspect of the present invention, there is provided a plastic optical fiber connector in which at least a pair of plug connectors having plastic optical fiber cables are held so that the end faces of optical fibers are opposed to each other, wherein it comprises an adaptor which is provided with a plurality of connector receptacles that receive the plug connectors inserted therein from opposite directions.

Preferably, the adaptor is detachably attached to an adaptor holder which is secured to a substrate, so as to facilitate the attachment or detachment of the plug connector.

The attachment mechanism can be realized by a dove-tail groove provided in the adaptor holder and a projection provided in the adaptor, which can be disengageably engaged in the dove-tail groove.

According to another aspect of the present invention, there is provided a plastic optical fiber connector in which at least a pair of plug connectors having plastic optical fiber cables are held so that the end faces of optical fibers are opposed to each other, wherein said plug connector is provided with an anchoring member which is adapted to secure the plastic optical fiber cable to the plug connector and which is provided with a wedge-shaped projection which can pierce into a sheath of the plastic optical fiber cable without coming into contact with a body of the plastic optical fiber cable.

To secure the anchoring member to the plug connector, the plug connector can be comprised of an insertion hole in which the anchoring member can be inserted, and a tapered surface which guides the anchoring member pierced into the sheath of the plastic optical fiber cable, so that the anchoring member which has been inserted through the insertion hole and which has been pierced into the sheath of the plastic optical fiber cable engages with the tapered surface to be secured to the plug connector.

The connector of the present invention can be advantageously applied either to a single-core POF cable or a dual-core POF cable.

According to another aspect of the present invention, there is provided a plastic optical fiber connector in which at least a pair of plug connectors having plastic optical fiber cables are held so that the end faces of optical fibers are opposed to each other, wherein it comprises ferrules which are secured to the front end of the plug connectors to hold the plastic optical fiber bodies with the removed sheaths, tapered split sleeves which are attached to the front ends of the plastic optical fiber bodies with the removed sheaths and which are each provided with a tapered outer surface and a longitudinal slit, and stepped portions which are formed on the ferrules and which abut against the tapered outer surfaces of the split sleeves.

According to still another aspect of the present invention, a plastic optical fiber connector in which at least a pair of plug connectors having plastic optical fiber cables are held so that the end faces of optical fibers are opposed to each other, comprises ferrules which are secured to the front end of the plug connectors. These ferrules are provided with fiber support holes in which the plastic optical fiber bodies with the removed sheaths can be inserted, and fiber holding grooves which are not connected to the fiber support holes and which face the end faces of the corresponding ferrules, wherein when the front ends of the plastic optical fiber bodies protruding from the front ends of the ferrules are melted and flattened, the molten resin is introduced into the fiber holding grooves through thin films formed on the front end faces of the ferrules.

Preferably, the fiber holding grooves are concentric to the corresponding fiber support holes.

According to still another aspect of the present invention, there is provided a plastic optical fiber connector, comprising dual-core plastic optical fiber cables, each being made of two parallel, single-core plastic optical fiber cables having plastic optical fiber bodies covered with sheaths; plug connectors which hold the dual-core plastic optical fiber cables; ferrules which are provided at the front ends of the plug connectors and which are each provided with a pair of fiber support holes in which the dual-core plastic optical fiber bodies with the removed sheath can be inserted; wherein the distance between the center axes of the pair of fiber support holes is substantially identical to the distance between the center axes of the plastic optical fiber bodies of the dual-core plastic optical fiber cable.

The present disclosure relates to subject matter contained in Japanese Patent Application No.9-121006 (filed on May 12, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
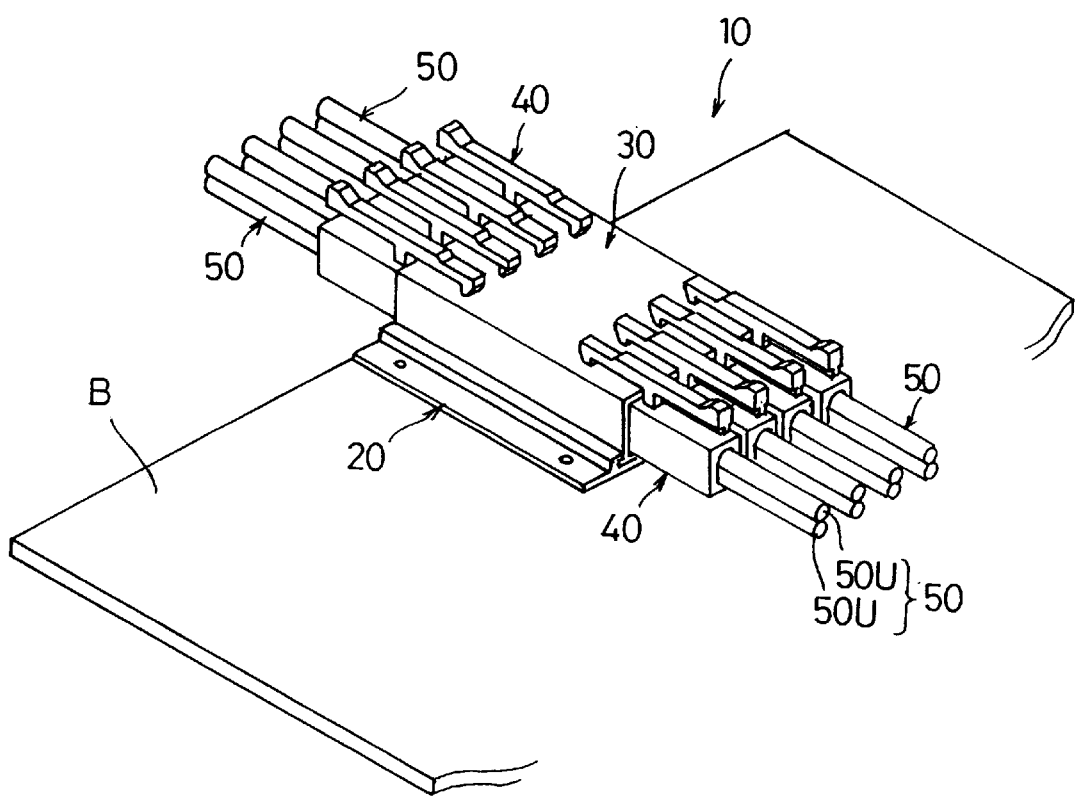
FIG. 1 is a perspective view of an assembly of a POF connector according to the present invention.
Figure 2:
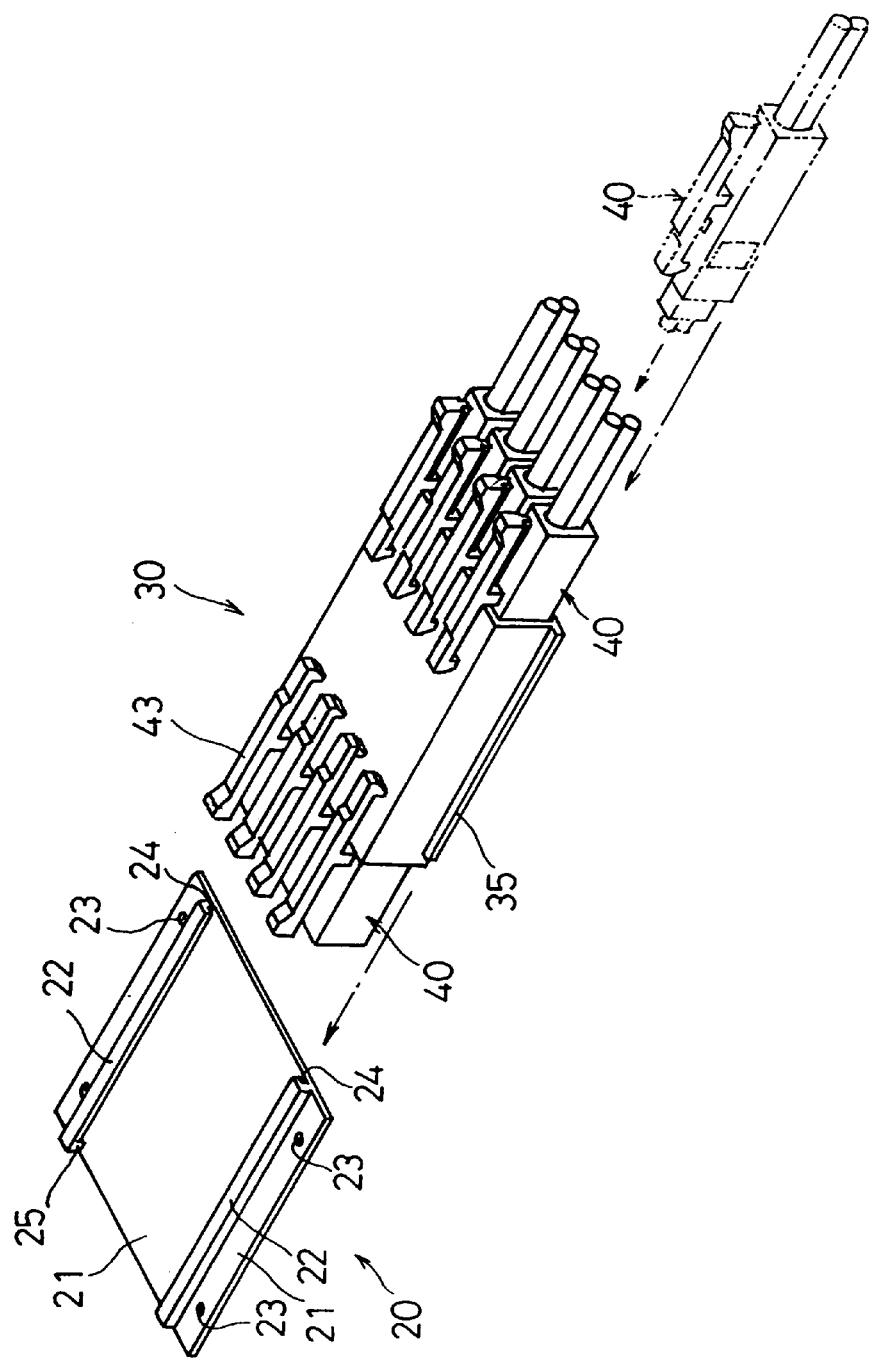
FIG. 2 is a perspective view of an exploded perspective view of an adaptor holder and an adaptor in which a plug connector is inserted, shown in FIG. 1.
Figure 3:
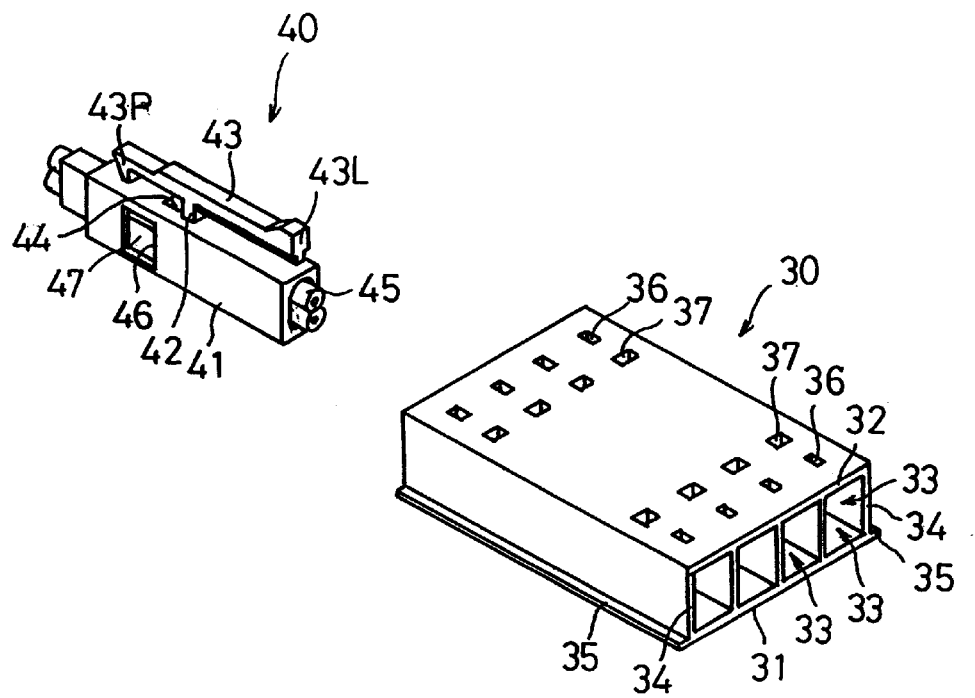
FIG. 3 is a perspective view of an adaptor and a plug connector, shown in FIG. 2.

As can be seen in FIGS. 1 through 4, a POF connector 10 is essentially composed of an adaptor holder 20 secured to a substrate B, an adaptor 30 which is detachably attached to the adaptor holder 20, and a plurality of identical plug connectors 40 which are removably inserted in the adaptor 30.

The adaptor holder 20 is comprised of a plate portion 21 which lies in a plane parallel with the substrate B and a pair of parallel dove-tail grooves 22 provided on the plate portion 21. The dove-tail projections 22 define a pair of dove-tail grooves 24 extending along the plate portion 21. The plate portion 21 is provided with securing screw insertion holes 23 on the outer side of the projections 22, in which securing screws are inserted to secure the adaptor holder 20 to the substrate B. The dove-tail grooves 24 are closed at their one end by end walls 25.

The adaptor 30 detachably and independently holds a plurality of plug connectors 40 (four pairs of double-core plug connectors 40 in the illustrated embodiment) and is composed of a bottom wall 31 which lies along the plate portion 21 of the adaptor holder 20 when assembled, an upper wall 32 parallel with the bottom wall 31, and separation walls 34 which connect the upper wall 32 and the bottom wall 31 and define four connector receptacles (chambers) 33. The bottom wall 31 is provided on opposed ends thereof with insertion projections 35 which can be fitted in the dove-tail grooves 24. The connector receptacles 33 are each made of a through hole having a uniform rectangular sectional shape, defined by the bottom wall 31, the upper wall 32 and the separation walls 34. The upper wall 32 is provided with outer friction lock holes 36 and inner lock lever holes 37 in a symmetrical arrangement with respect to the center of each connector receptacle 33 in the longitudinal direction thereof.

The identical plug connectors 40 in each pair are inserted in the respective connector receptacles 33 from opposite directions. The plug connectors 40 are each provided with a substantially rectangular housing 41 whose contour corresponds to that of the connector receptacle 33, a lock arm 43 provided on the housing 41 through a support post 42, so that the lock arm 43 and the support post 42 define a T-shape, and a friction projection 44 on the housing 41. The lock arm 43 is provided on its front end (tip end to be inserted in the adaptor 30) with a lock hook 43P which can be disengageably engaged in the associated lock lever hole 37. The lock arm 43 is provided at the rear end thereof with an unlocking operation portion 43L. When the unlocking operation portion 43L is depressed, the lock hook 43P is elastically deformed upward. The friction projection 44 engages in the friction lock hole 36.

The hollow housing 41 is provided with a longitudinal hole 41H in which a dual-core POF cable 50 can be inserted. A ferrule 45 is secured to the front end of the housing 41. The dual-core POF cable 50 is composed of a pair of single-core POF cables 50U, each consisting of a center plastic optical fiber body 51 and an outer sheath 52 therefor. The outer sheaths of the two POF cables are adhered, so that the POF cable bodies 51 extend in parallel to define a dual-core POF cable 50.

Figure 6:
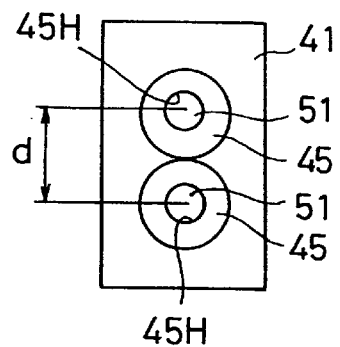
FIG. 6 is a front elevational view of a plug connector viewed from the ferrule side.

The ferrule 45 holds the POF bodies 51 of the single-core POF cables 50U with removed sheaths 52 and has a pair of fiber support holes 45H whose inner diameter is determined taking into account the irregularity in the diameter of the POF bodies 51 so that the largest diameter POF body 51 can be inserted therein. The distance d (FIGS. 4 and 6) between the center axes of the fiber support holes 45H of the ferrule 45 is substantially identical to the distance d (FIG. 4) between the center axes of the single-core POF cables 50U, of which the dual-core POF cable 50 is made, so that the single-core POF cables 50U can be introduced to the end of the ferrule 45 without deforming (expanding) the single-core POF cables 50F of the dual-core POF cable 50. In the prior art, the distance between the fiber support holes of the ferrule 45 is larger than the distance between the single-core POF cables 50U of the dual-core POF cable 50, and hence, the latter cannot be introduced without opening (increasing the distance between) the single-core POF cables 50U. This causes a connection loss (transmission loss).

Figure 7:
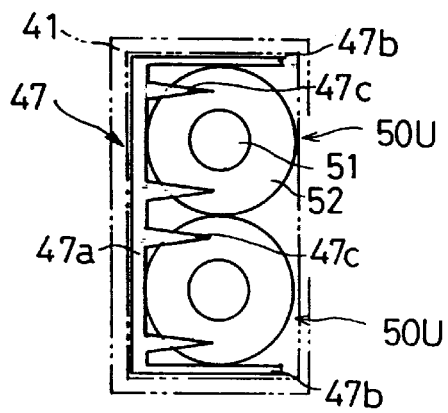
FIG. 7 is a sectional view of plastic optical fiber cables and an anchoring member, taken along the line VI—VI in FIG. 4.
Figure 8:
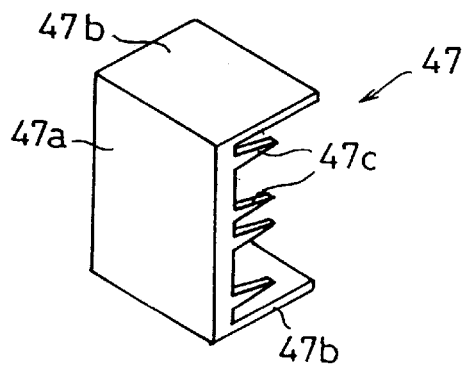
FIG. 8 is a perspective view of an anchoring member shown in FIG. 7.

The housing 41 is equipped with an anchoring member insertion hole 46 on the side surface thereof. An anchoring member 47 which is inserted in the insertion hole 46 is adapted to hold the dual-core POF cable 50 in the housing 41 without deforming or substantially deforming the POF body 51. As can be seen in FIGS. 7 and 8, the housing 41 is provided with a large surface area portion (side plate) 47a along the outer surfaces of a pair of single-core POF cable 50U and small surface area portions (end plates) 47b extending along the outer surface of one of the single-core POF cables 50U. The small surface area portions 47b extend perpendicular to the large surface area portion 47a, so that the anchoring member 47 is of generally U-shape. The large surface area portion 47a is provided, on opposite ends thereof in the longitudinal direction of the single-core POF cables 50U, with wedge-shaped (or needle-like) projections 47c corresponding to the single-core POF cables 50U. When the anchoring member 47 is inserted in the housing 41 through the insertion hole 46, the wedge-shaped projections 47c pierce into the outer sheaths 52 of the single-core POF cables 50U without contacting with the POF bodies 51. The housing 41 is equipped, on the upper and lower surfaces of the axial hole 41H of the housing 41, with tapered surfaces 41a whose diameter is gradually reduced toward the ferrule side 45. Consequently, if the dual-core POF cable 50 is moved toward the ferrule 45 while the anchoring member 47 is pierced in the sheaths 52 of the dual-core POF cable 50, the anchoring member 47 is moved from the insertion hole 46 toward the ferrule 45 while being guided by the tapered surfaces 41a, so that the dual-core POF cable 50 can be firmly held in the housing 41. The tapered surfaces 41a not only prevent the anchoring member 47 from moving in the axial direction due to the wedge effect, but also hold the dual-core POF cable 50 at the center portion of the housing 41.

In conventional anchoring members, the dual-core POF cable 50 (single-core POF cables 50U) is pressed at the outer surface thereof, and hence, the POF body 51 is deformed, thus resulting in the transmission band being narrowed. However, in the present invention, since the wedge-shaped projections 47c of the anchoring member 47 are pierced in the sheaths 52 of the POF cable, there is no danger of the POF body 51 is pressed or deformed. Consequently, a wide transmission band can be obtained.

As mentioned above, the wedge-shaped projections 47c of the anchoring member 47 pressed into the housing 41 of the plug connector 40 through the insertion hole 46 are pierced in the sheaths 52 of the dual-core POF cable 50 inserted in the housing 41. Thereafter, the dual-core POF cable 50 is moved toward the ferrule 45, the anchoring member 47 is moved toward the ferrule 45 while being guided by the tapered surfaces 41a, so that the anchoring member 47 is engaged by the tapered surface 41a. Thus, the dual-core POF cable 50 can be firmly connected to the housing 41. The POF bodies 51 which protrude from the tip end of the ferrule 45 are heated and melted in a planar form.

Figure 5:
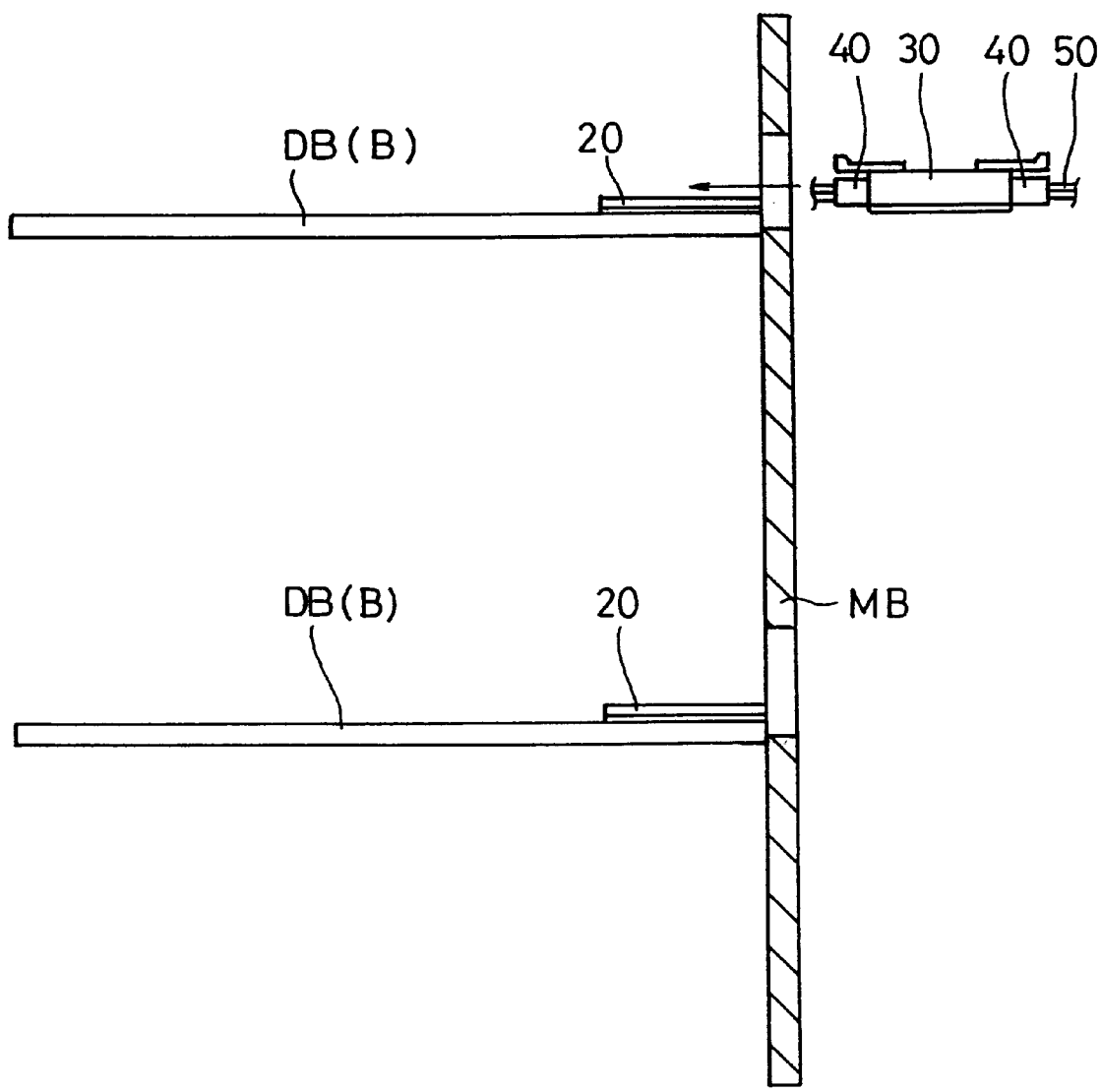
FIG. 5 is a plan view of a mother board and daughter boards to which POF connectors according to the present invention are provided.

In the POF connector 10 constructed as described above, the plug connector 40 is detachably attached to the adaptor 30 which is in turn detachably attached to the adaptor holder 20 which is secured in advance to the substrate B. Namely, assuming that the substrate B corresponds, for example, to a daughter board DB secured to a mother board MB shown in FIG. 5, it would be troublesome to attach or detach the plug connector 40 to or from the adaptor 30 attached to the adaptor holder 20. To solve this problem, the adaptor 30 is detached from the adaptor holder 20, so that the adaptor 30 is free from the substrate B, and in this state, the plug connectors 40 are detached from or attached to the corresponding connector receptacles 33 of the adaptor 30.

To remove the plug connector 40 from the connector receptacle 33, the unlocking operation portion 43L of the lock arm 43 of the plug connector 40 is depressed to disengage the lock hook 43P from the lock lever hole 37 of the adaptor 30. Consequently, the plug connector 40 can be withdrawn from the connector receptacle 33. To insert the plug connector 40 in the connector receptacle 33, the housing 41 is fitted in the connector receptacle 33, so that the lock hook 43P is moved upward by the upper wall 32 of the adaptor 30. When the lock hook 43P is registered with the lock lever hole 37, the lock hook 43P is engaged in the lock lever hole 37 due to the elastic deformation of the lock arm 43, so that the plug connector can be fitted in place and firmly connected to the connector receptacle. The friction projection 44 produces an appropriate resistance during the insertion or withdrawal of the plug connector in or from the connector receptacle 33. Upon completion of the positioning, the friction projection 44 engages in the friction lock hole 36 to provide a supplemental locking function.

When the plug connectors 40 are inserted in the corresponding connector receptacles 33 from opposite sides, the POF bodies 51 held by the ferrules 45 of the plug connectors 40 on opposite sides are opposed to and are brought into contact with each other to establish an electrical connection therebetween. Upon completion of insertion of the plug connectors 40 in the connector receptacles 33, the projections 35 of the adaptor 30 are inserted in the dove-tail grooves 24 of the adaptor holder 20 until the front ends of the projections 35 abut against the end walls 25. Thus, the plug connectors 40 are positioned in place and firmly held in the connector receptacles. Since the adaptor 30 is provided with a plurality of connector receptacles 33, the connection of the POFs can be effectively carried out.

Figure 9:
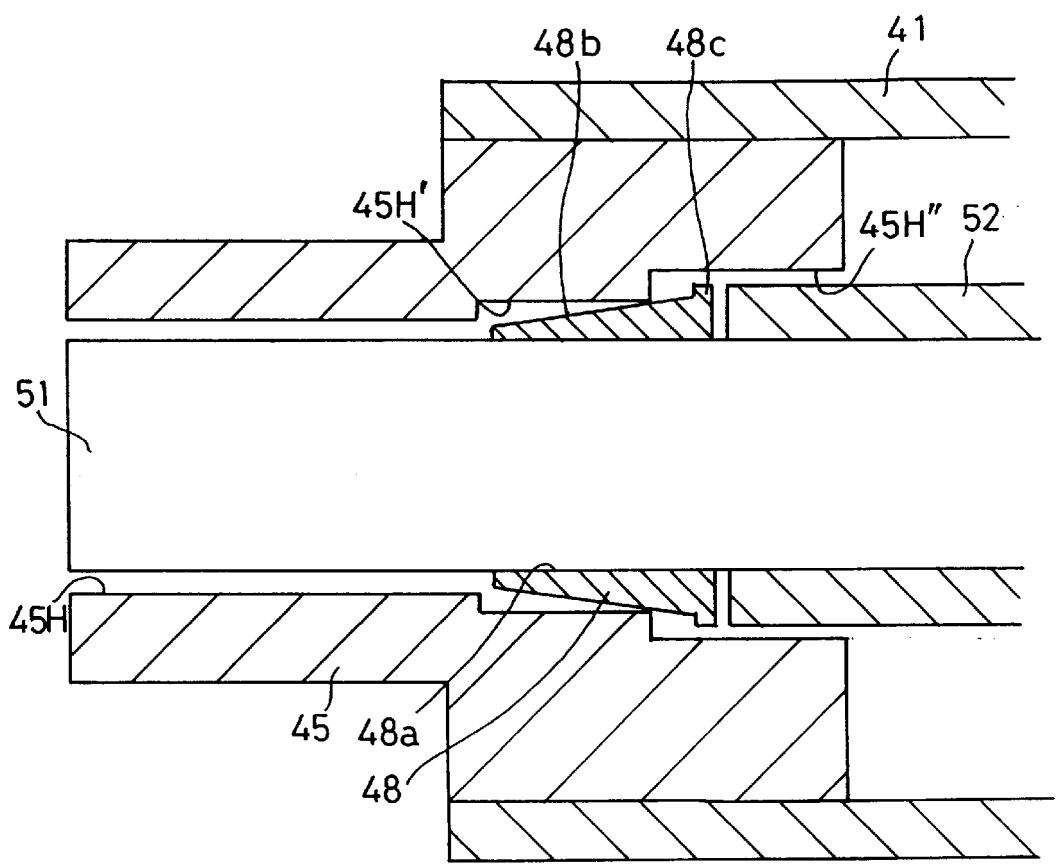
FIG. 9 is a sectional view of a support mechanism of a plastic optical fiber cable held in a fiber support hole of a ferrule.
Figure 10:
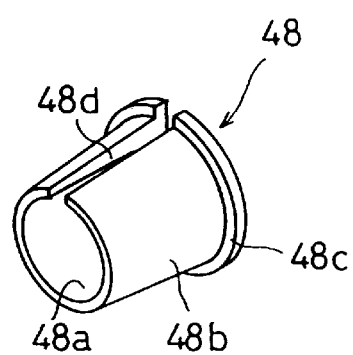
FIG. 10 is a perspective view of a split conical sleeve used in the support mechanism shown in FIG. 9.

An embodiment in which the POF body 51 can be held at the center portion of the fiber support hole 45H, regardless of the irregularity in the diameter of the POF bodies 51 of the single-core POF cable 50U will be discussed below with reference to FIGS. 9 and 10.

As mentioned above, the diameter of the POF body 51 varies approximately in the range of 0.94 to 1.06 mm$\phi$ with respect to a nominal diameter of 1.0 mm$\phi$. Therefore, the inner diameter of the fiber support hole 45H must be equal to or larger than 1.06 mm$\phi$. In this connection, if the smallest diameter POF body 51 and the largest diameter POF body 51 are opposed to each other at a maximum deviation in the support hole 45H, a connection loss (transmission loss) of more than 0.8 dB is produced.

To eliminate the connection loss, the ferrule 45 secured to the end of the housing 41 is provided, on the end thereof away from the connection end, with two stepped concentric holes 45H' and 45H" whose diameters are larger than the diameter of the fiber support hole 45H. A split sleeve 48 in the form of a truncated cone is fitted in the stepped holes 45H' and 45H". The split sleeve 48 is provided with a center hole 48a whose diameter in free state is smaller than the minimum diameter of the POF body 51, an outer conical surface 48b, a peripheral flange 48c provided on the large diameter end of the conical surface 48b, and a longitudinal slit 48d. The diameter of the conical surface 48b has a minimum diameter smaller than the diameter of the stepped hole 45H' and a maximum diameter larger than the diameter of the stepped hole 45H'. The diameter of the flange 48c is smaller than the inner diameter of the stepped hole 45H".

Upon insertion of the POF body 51 of the single-core POF cable 50U into the ferrule 45, the sheath at the end thereof is removed, and thereafter, the split sleeve 48 is attached to the end of the single-core POF cable 50U with the removed sheath. Since the inner diameter of the center hole 48a of the split sleeve 48 in a free state is smaller than the minimum diameter of the POF body 51, the split sleeve 48 is elastically deformed to expand the slit 48d, so that the split sleeve 48 can be fitted to the outer peripheral surface of the POF body 51. The single-core POF cable 50U of which the split sleeve 48 has been fitted to the front end of the POF body 51 is inserted in the housing 41 from the side opposite the ferrule 45 and is forced into the ferrule 45. Consequently, the conical surface 48b engages with the connection between the stepped holes 45H' and 45H". Thus, the axis of the POF body 51 is aligned with the axis of the fiber support hole 45H.

Figure 11:
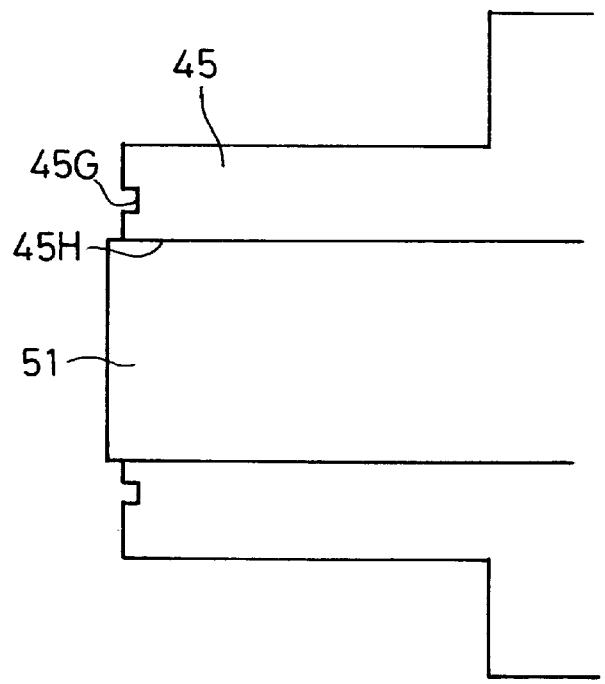
FIG. 11 is a sectional view of a movement prevention mechanism of a plastic optical fiber cable relative to a ferrule.
Figure 12:
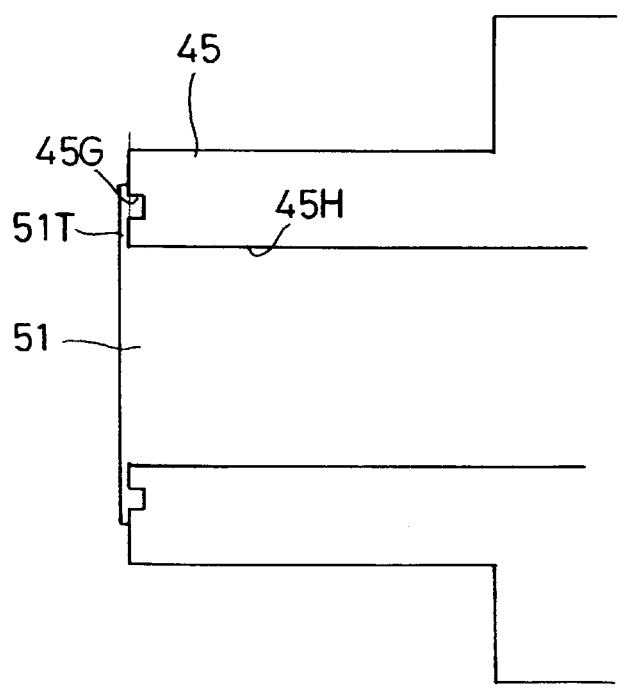
FIG. 12 is a sectional view of a movement prevention mechanism of a plastic optical fiber cable relative to a ferrule, in a position different from FIG. 11; and, FIG. 13 is a perspective view of an adaptor holder according to another embodiment of the present invention.

FIGS. 11 and 12 show an embodiment in which no piston movement of the POF body 51 in the ferrule 45 (i.e., no axial movement of the POF body 51 within the fiber support hole 45H, or in particular, no retraction of the POF body 51 into the fiber support hole 45H) takes place, while keeping the transmission loss at a minimum value. In the POF cable, it is necessary to heat and melt the front end of the POF body 51 to make the same planar. In the prior art, to prevent the above-mentioned piston movement of the POF body using the melting operation, the fiber support hole 45H of the ferrule 45 is provided on the front end thereof with a stepped or tapered enlarged hole which is filled with the molten POF body 51. Thus, no piston movement of the POF body 51 (i.e., no retraction of the POF body 51 in the fiber support hole 45H) occurs. However, since the enlarged hole has a certain extent of diameter, a diffusion of light occurs at the enlarged hole, thus resulting in transmission loss. The axial length of the enlarged hole is approximately 0.25 mm in the prior art.

In this embodiment in which the POF body 51 is molten, in order to reduce transmission loss, the ferrule 45 is provided on the front end thereof with an annular groove 45G which is not connected to the fiber support hole 45H. When the front end of the POF body 51 is melted, the molten resin enters the annular groove 45G while forming a thin film 51T on the surface of the end of the POF body between the fiber support hole 45H and the annular groove 45G. As a result, no axial movement of the POF body occurs. According to the experiments, the thickness of the thin film 51T was around 0.05 mm. Therefore, the transmission loss can be made extremely small.

Note that the features of the embodiments shown in FIGS. 9 through 12 can be used independently of the features of the embodiment shown in FIGS. 1 through 8. Namely, the present invention can be applied to a POF connector in which a single POF is connected to another POF. Although the embodiment shown in FIGS. 1 through 8 is addressed to a dual-core POF cable 50, it can be also applied to a single-core POF cable 50U.

Figure 13:
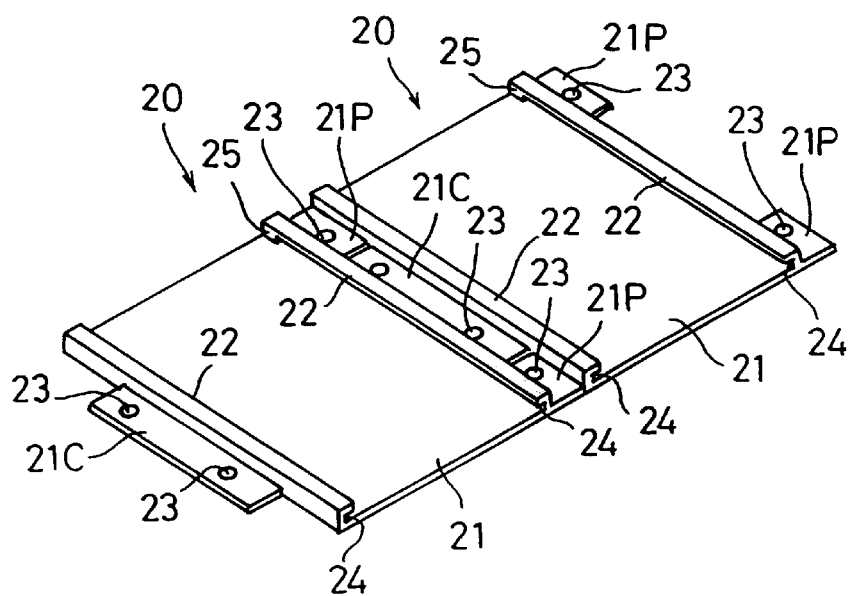
Figure 4:
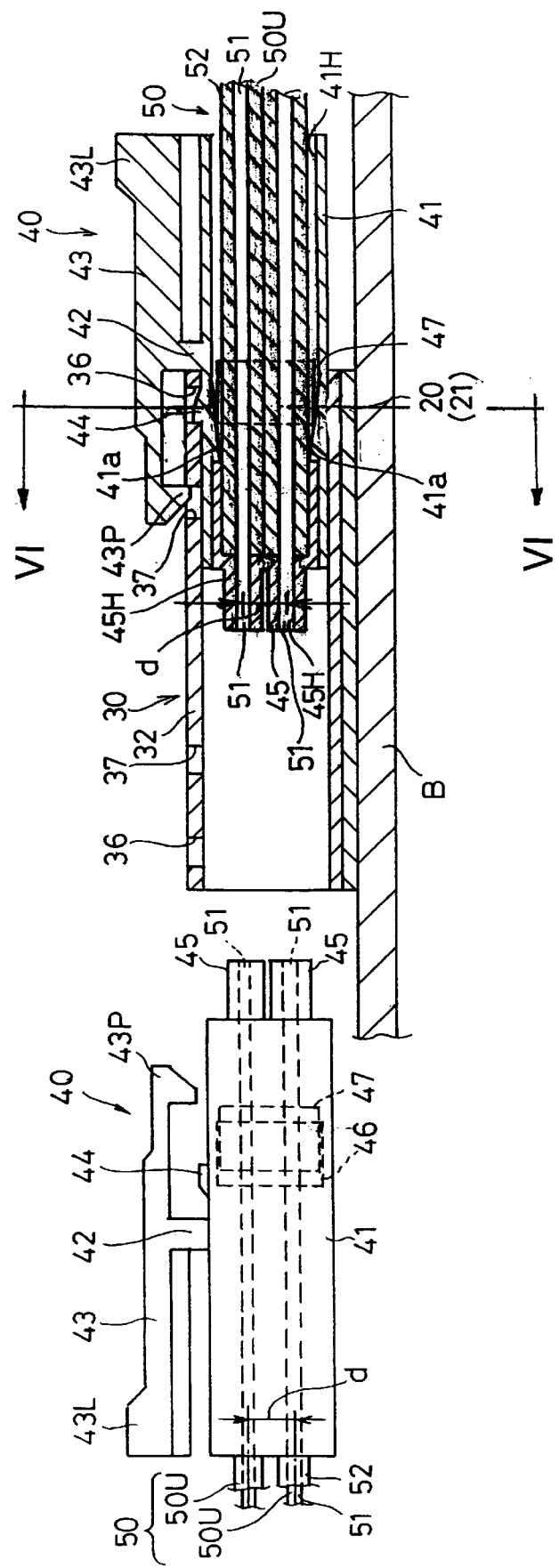
FIG. 4 is a sectional view of a pair of plug connectors one of which is inserted in a connector receptacle of an adaptor and the other being disconnected from a connector receptacle of the adaptor.

FIG. 13 shows an embodiment applied to a plurality of adaptor holders 20 arranged side by side in a narrow space. The adaptor holders 20 are each provided with a planar portion 21 which is equipped on one side thereof with a middle planar projection 21C having a pair of screw insertion holes 23 and on the other side with a pair of end planar projections 21P each having a screw insertion hole 23. The middle planar projection 21C on one side and the end planar projections 21P on the other side are arranged such that the middle planar projection 21C of one of the two adjacent adaptor holders 20 is located between the end planar projections 21P of the other adaptor holder 20. In this embodiment, two or more adaptor holders 20 can be arranged side by side and close to each, and hence the space utilization efficiency can be enhanced.

As may be understood from the foregoing, according to the present invention, a POF connector can be obtained in which the transmission band can be increased and the connection loss can be reduced, no or little deformation of the POF due to the pressure occurs, the POF can be correctly aligned with the axis of the ferrule, an axial movement of the POF relative to the ferrule can be prevented by a simple structure which can reduce the connection loss, and the insertion and removal operation can be easily carried out.

What is claimed is:

1. A plastic optical fiber connector for receiving and holding at least one pair of plug connectors wherein each plug connector of the pair is connected to a dual-core plastic optical fiber cable having two separate plastic optical fiber bodies extending parallel to one another and spaced from one another by a fixed distance d with each of the fiber bodies being covered by a sheath, said plastic optical fiber connector comprising an adaptor which is provided with at least one connector receptacle open at two opposite ends and capable of receiving the two plug connectors of said one pair inserted respectively into said two opposite ends of the connector receptacle, so that the end faces of the two fiber bodies of the cable held by one of the plug connectors become opposed respectively to the end faces of the two fiber bodies of the cable held by the other plug connector of the pair, each of said plug connectors having a hollow housing open at one end to receive a portion of the associated cable with the sheaths unremoved from the fiber bodies, and each of said plug connectors having a ferrule at an end opposite to said open end which ferrule has two through holes for receiving end portions of the fiber bodies of the associated cable from which end portions the sheaths have been removed, said ferrule holes being spaced from one another by said distance d and being of such diameter that, in assembling the associated cable to the plug connector, the unsheathed end portions of the cable can be easily pushed into the holes with the holes thereafter holding the end portions at said distance d from one another.

2. A plastic optical fiber connector according to claim 1, wherein said adaptor is detachably attached to an adaptor holder which is secured to a substrate.

3. A plastic optical fiber connector according to claim 2, wherein said adaptor holder is provided with a dove-tail groove, and said adaptor is provided with a projection which can be disengageably engaged in said dove-tail groove.

4. A plastic optical fiber connector in which at least one pair of plug connectors having plastic optical fiber cables are held so that end faces of optical fibers forming part of said cables are opposed to each other, wherein said plastic optical fiber cables are dual-core cables each having two separate plastic optical fiber bodies spaced from and parallel to one another, each of said plug connectors is provided with an anchoring member which is adapted to secure the associated one of said plastic optical fiber cables to said plug connector, each plug connector having a hollow housing with a side wall for receiving the associated cable and having a through opening in said side wall through which the anchoring member can be moved in bringing it into assembly with the housing and cable, said anchoring member is provided with a wedge-shaped projection shaped to pierce into a sheath of the associated plastic optical fiber cable without coming into contact with either one of said two fiber bodies of said associated plastic optical fiber cable as the anchoring member is moved into said opening in the housing side wall.

5. A plastic optical fiber connector according to claim 4, wherein said plastic optical fiber cable is of a dual-core type, and said anchoring member is provided with wedge-shaped projections which can pierce into the sheaths of said dual-core plastic optical fiber cable.

6. A plastic optical fiber connector in which at least a pair of plug connectors having plastic optical fiber cables are held so that the end faces of optical fibers forming part of said cables are opposed to each other, wherein said plug connectors are provided with an anchoring member which is adapted to secure said plastic optical fiber cable to said plug connectors and which is provided with a wedge-shaped projection which can pierce into a sheath of said plastic optical fiber cable without coming into contact with said plastic optical fibers, and in which said plug connector is comprised of an insertion hole in which said anchoring member can be inserted, and a tapered surface which guides said anchoring member pierced into the sheath of said plastic optical fiber cable, so that said anchoring member which has been inserted through said insertion hole and which has been pierced into the sheath of said plastic optical fiber cable engages with said tapered surface to be secured to said plug connector.

7. A plastic optical fiber connector for connecting together at least one pair of plug connectors, with each plug connector of the pair holding an associated plastic optical fiber cable with at least one optical fiber body, so that the end faces of the optical fiber bodies of the pair of plug connectors are opposed to each other, said plastic optical fiber connector comprising:

ferrules which are secured to the front ends of said plug connectors and each of which ferrules has a through hole to hold a plastic optical fiber body of the associated cable, which through hole has a diameter equal to or greater than the diameter of the fiber body it receives, a fiber body in being inserted into a ferrule hole moving in an insertion direction;

for each ferrule through hole a tapered split sleeve is received on the plastic optical fiber body associated with the ferrule through hole and has a tapered outer surface and a longitudinal slit, the sleeve also having a through hole receiving the associated fiber body which sleeve through hole in an undeformed state of the sleeve has a diameter slightly less than that of the fiber body so that the sleeve frictionally grips the fiber body received in the sleeve through hole; and a stepped portion formed on each of said ferrules and which stepped portion defines a circular edge of the ferrule which edge engages the tapered outer surface of the associated split sleeve to center the sleeve and the associated fiber body relative to the ferrule hole as the fiber body and sleeve are moved in the insertion direction during assembly of a cable with a plug connector.

8. A plastic optical fiber connector in which at least a pair of plug connectors having plastic optical fiber cables are held so that the end faces of optical fibers are opposed to each other, said plastic optical fiber connector comprising:

ferrules which are secured to the front end of said plug connectors, said ferrules being provided with fiber support holes in which plastic optical fiber bodies with removed sheaths can be inserted; and each of said ferrules having a front end with an end face and an annular fiber holding groove in the end face which fiber holding groove is not connected to the fiber support hole of the ferrule; and as a result of a front end of a plastic optical fiber body protruding from the front end of the ferrule having been melted to produce molten resin and the molten resin then having been flattened, said fiber holding groove being filled with an annular body of resin connected by a thin film of resin to the fiber body to resist displacement of the fiber body relative to the ferrule by a force applied to the fiber body in the direction tending to pull the thin film toward the ferrule end face.

9. A plastic optical fiber connector according to claim 8, wherein said fiber holding groove is concentric to the associated fiber support hole.

* * * * *